(12) United States Patent
Li (10) Patent No.: US 11,587,356 B2
(45) Date of Patent: Feb. 21, 2023

(54) METHOD AND DEVICE FOR AGE ESTIMATION

(71) Applicant: BEIJING DAJIA INTERNET INFORMATION TECHNOLOGY CO., LTD., Beijing (CN)

(72) Inventor: Xuanping Li, Beijing (CN)

(73) Assignee: Beijing Dajia Internet Information Technology Co., Ltd., Beijing (CN)

(*) Notice: Subject to any disclaimer, the term of this patent is extended or adjusted under 35 U.S.C. 154(b) by 235 days.

(21) Appl. No.: 16/762,706

(22) PCT Filed: Nov. 7, 2018

(86) PCT No.: PCT/CN2018/114368
§ 371 (c)(1),
(2) Date: May 8, 2020

(87) PCT Pub. No.: WO2019/091402
PCT Pub. Date: May 16, 2019

(65) Prior Publication Data
US 2021/0174066 A1    Jun. 10, 2021

(30) Foreign Application Priority Data

Nov. 9, 2017   (CN) .......................... 201711100297.9

(51) Int. Cl.
*G06V 40/16*   (2022.01)
*G06N 20/00*   (2019.01)
*G06K 9/62*    (2022.01)

(52) U.S. Cl.
CPC ......... *G06V 40/172* (2022.01); *G06K 9/6257* (2013.01); *G06K 9/6277* (2013.01); *G06N 20/00* (2019.01); *G06V 40/178* (2022.01)

(58) Field of Classification Search
CPC .... G06V 40/172; G06V 40/178; G06V 40/16; G06V 10/82; G06K 9/6257;
(Continued)

(56) References Cited

U.S. PATENT DOCUMENTS

2015/0139485 A1   5/2015  Bourdev et al.
2018/0150684 A1*  5/2018  Wang ................... G06N 3/0454
(Continued)

FOREIGN PATENT DOCUMENTS

CN    105095833 A    11/2015
CN    105426872 A     3/2016
(Continued)

OTHER PUBLICATIONS

Translated version of CN106384080 (Year: 2017).*
(Continued)

*Primary Examiner* — Carol Wang
(74) *Attorney, Agent, or Firm* — Meunier Carlin & Curfman LLC (57) ABSTRACT

Provided in embodiments of the present application are a method and device for age estimation. The method comprises: performing gender training with respect to a gender model on the basis of facial image samples so as to allow the gender model to converge, where the gender model comprises at least two convolution layers; performing age training with respect to an age model on the basis of the facial samples so as to allow the age model to converge, where the age model comprises the at least two convolution layers, the converged age model comprises the weights of the at least two convolution layers, and the weights of the at least two convolution layers that the converged gender model comprises; and performing age estimation with respect to an inputted facial image on the basis of the converged age model. The technical solution provided in the embodiments (Continued)

of the present application eliminates the problem of inaccurate age estimation as a result of gender differences of facial images, thus increasing the accuracy of age estimation.

14 Claims, 2 Drawing Sheets

(58) Field of Classification Search
CPC .. G06K 9/6277; G06K 9/6272; G06K 9/6256; G06K 9/00288; G06K 9/00221; G06K 2009/00322; G06N 20/00; G06N 3/0454; G06N 3/08
See application file for complete search history.

(56) References Cited

U.S. PATENT DOCUMENTS

| | | | |
|---|---|---|---|
| 2019/0259384 A1* | 8/2019 | Singh | G06V 40/70 |
| 2019/0279089 A1* | 9/2019 | Wang | G06N 3/0481 |

FOREIGN PATENT DOCUMENTS

| | | | | |
|---|---|---|---|---|
| CN | 106384080 A | * | 2/2017 | |
| CN | 106503669 A | * | 3/2017 | ......... G06K 9/00241 |
| CN | 106529402 A | * | 3/2017 | |
| CN | 106951825 A | | 7/2017 | |
| CN | 108052862 A | | 5/2018 | |
| CN | 108197592 A | * | 6/2018 | |

OTHER PUBLICATIONS

Translated version of CN108197592 (Year: 2018).*
Zhu, Linnan, Keze Wang, Liang Lin, and Lei Zhang. "Learning a lightweight deep convolutional network for joint age and gender recognition." In 2016 23rd International Conference on Pattern Recognition (ICPR), pp. 3282-3287. IEEE, 2016. (Year: 2016).*
Translated version of CN106529402 (Year: 2017).*
International Search Report and Written Opinion issued by the International Searching Authority (ISA/CN) in PCT Application No. PCT/CN2018/114368 dated Feb. 12, 2019. 9 pages, including English translation of International Search Report.

* cited by examiner

METHOD AND DEVICE FOR AGE ESTIMATION

CROSS REFERENCE TO RELATED APPLICATIONS

The present application is a National Stage of International Application No. PCT/CN2018/114368, filed Nov. 7, 2018, which claims the priority from Chinese Patent Application No. 201711100297.9, filed with the Chinese Patent Office on Nov. 9, 2017 and entitled "Method and Device for Age Estimation", both of which are hereby incorporated by reference in their entireties.

FIELD

The present application relates to the field of computer vision technologies, and in particular to an age estimation method and device.

BACKGROUND

As the age of the face image is more and more widely used in the fields of Internet user portrait, precise advertising delivery, image or video recommendation, etc., the demand for the age estimation of the face image is increasing. The age of the face image is the age of the person in the face image, and the age estimation of the face image is the age estimation of the person in the image based on the face image.

At present, the methods for the age estimation of the face image mainly include traditional machine learning methods. Specifically, the artificial features such as Histogram of Oriented Gradient (HOG) and Scale-Invariant Feature Taransform (SIFT) are firstly designed and defined, then the effective features useful for the age estimation in the face image are extracted by the dimensionality reduction method, and finally the age of the face image is estimated by using the extracted features and a regression model.

The features learned by the traditional machine learning methods have poor robustness to the information such as noise, background, light, and different states of the face, resulting in the inaccurate age estimation of the face image. For example, by using the traditional machine learning methods, the age difference detected for face images of the same person taken in different scenes is relatively large, and the accuracy of the age estimation of the face images is relatively low.

BRIEF SUMMARY

Embodiments of the present application provide an age estimation method and device to solve the problem of relatively low accuracy in estimating the age of the face image in the related art.

In order to solve the above problem, according to an aspect of the embodiments of the present application, an embodiment of the present application discloses an age estimation method, including:

performing gender training on a gender model according to face image samples to converge the gender model, wherein the gender model includes at least two convolution layers;

performing age training on an age model according to the face image samples to converge the age model, wherein the age model includes the at least two convolution layers, and weights of the at least two convolution layers included in the converged age model are same as weights of the at least two convolution layers included in the converged gender model; and performing age estimation on an inputted face image according to the converged age model.

Optionally, the gender model further includes at least one first fully connected layer and a first classifier, and the performing gender training on the gender model according to the face image samples to converge the gender model includes:

performing gender training on the at least two convolution layers, the at least one first fully connected layer and the first classifier included in the gender model according to gender labeling information of the face image samples, to converge the gender model.

Optionally, the age model further includes at least one convolution layer, at least one second fully connected layer and a second classifier in addition to the at least two convolution layers, and the performing age training on the age model according to the face image samples to converge the age model, includes:

performing age training on the at least one convolution layer, the at least one second fully connected layer and the second classifier included in the age model according to age labeling information of the face image samples to converge the age model.

Optionally, before performing the age estimation on the inputted face image according to the converged age model, the method further includes:

setting a learning rate of the age model to a preset learning rate after converging the age model, and performing secondary age training on the age model according to the face image samples to converge the age model again.

Optionally, the performing age estimation on the inputted face image according to the converged age model, includes:

performing age estimation on the inputted face image according to the converged age model to obtain a probability value corresponding to each age category; and calculating an estimated age of the face image according to the probability value corresponding to each age category and an age corresponding to each age category.

Optionally, the calculating the estimated age of the face image according to the probability value corresponding to each age category and an age corresponding to each age category, includes:

calculating the estimated age, meanAge, of the face image by using a formula of:

$$\text{meanAge} = \Sigma_i^n \text{MiddleAge}_i \times p_i;$$

wherein $\text{MiddleAge}_i$ is a mean age corresponding to an $i^{th}$ age category, $p_i$ is a probability value corresponding to the $i^{th}$ age category, and n is the number of age categories.

According to another aspect of the embodiments of the present application, an embodiment of the present application further discloses an age estimate device, including:

a first training module configured to perform gender training on a gender model according to face image samples to converge the gender model, wherein the gender model includes at least two convolution layers;

a second training module configured to perform age training on an age model according to the face image samples to converge the age model, wherein the age model includes the at least two convolution layers, and weights of the at least two convolution layers included in the converged age model are same as weights of the at least two convolution layers included in the converged gender model; and an estimation module configured to perform age estimation on an inputted face image according to the converged age model.

Optionally, the gender model further includes at least one first fully connected layer and a first classifier, and the first training module includes:

a first training submodule configured to perform gender training on the at least two convolution layers, the at least one first fully connected layer and the first classifier included in the gender model according to gender labeling information of the face image samples to converge the gender model.

Optionally, the age model further includes at least one convolution layer, at least one second fully connected layer and a second classifier, and the second training module includes:

a second training submodule configured to perform age training on the at least one convolution layer, the at least one second fully connected layer and the second classifier included in the age model according to age labeling information of the face image samples to converge the age model.

Optionally, the device further includes:

a third training module configured to set a learning rate of the age model to a preset learning rate after converging the age model, and perform secondary age training on the age model according to the face image samples to converge the age model again.

Optionally, the estimation module includes:

an estimation submodule configured to perform age estimation on the inputted face image according to the converged age model to obtain a probability value corresponding to each age category; and a calculation submodule configured to calculate an estimated age of the face image according to the probability value corresponding to each age category and an age corresponding to each age category.

Optionally, the calculation submodule is configured to calculate the estimated age, meanAge, of the face image by using a formula of:

$$\text{meanAge} = \Sigma_i^n \text{MiddleAge}_i \times p_i;$$

wherein $\text{MiddleAge}_i$ is a mean age corresponding to an $i^{th}$ age category, $p_i$ is a probability value corresponding to the $i^{th}$ age category, and n is the number of age categories.

According to another aspect of the embodiments of the present application, an embodiment of the present application further discloses a mobile terminal including: a memory, a processor and an age estimation program that is stored on the memory and can run on the processor, where the age estimation program implements the age estimation method described above when executed by the processor.

According to another aspect of the embodiments of the present application, an embodiment of the present application further discloses a computer readable storage medium storing an age estimation program thereon, where the age estimation program implements the age estimation method described above when executed by a processor.

According to another aspect of the embodiments of the present application, an embodiment of the present application further discloses a computer program which implements the age estimation method described above when executed by a processor.

Compared with the related art, the technical solution provided by the embodiments of the present application include the following advantages:

In the embodiments of the present application, the gender model and the age model share at least two convolution layers, and the gender model is trained to be converged; and the age model is trained, where the weights of the at least two convolution layers described above remain unchanged in the age model training process and they are still the weights after the convergence of the gender model, so that the training process of the age model can be supervised by the gender information. Finally, the converged age model is utilized to perform the age estimation on the face image, which can eliminate the problem of inaccurate age estimation caused by the gender difference in face images, and further improve the accuracy of the age estimation.

DETAILED DESCRIPTION OF THE EMBODIMENTS

In order to make the above-mentioned objects, features and advantages of the embodiments of the present application more apparent, the present application will be further illustrated below in combination with the drawings and specific embodiments.

Figure 1:
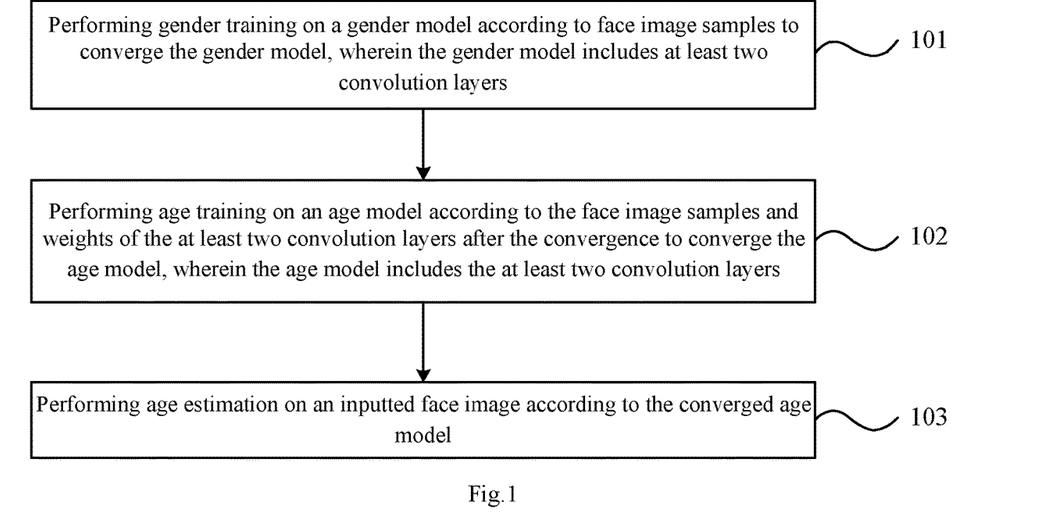
FIG. 1 is a flow chart of an age estimation method according to an embodiment of the present application.

Referring to FIG. 1, a flow chart of an age estimation method according to an embodiment of the present application is illustrated, which may specifically include the following operations.

Operation 101: performing gender training on a gender model according to face image samples to converge the gender model, wherein the gender model includes at least two convolution layers.

Here, the face image samples include multiple face images, and each face image is labeled with age information and gender information. Here, the gender model is used to detect the gender of the face image, the gender model may be a deep neural network model, and the gender model includes at least two convolution layers. In the embodiment of the present application, the gender training is performed on the gender model according to the face image samples labeled with gender information, so as to adjust the weight of each network layer in the gender model until the gender model converges. The so-called convergence of the gender model means that the error between the gender prediction result outputted by the gender model and the actual gender is less than the preset error threshold. The network layers of the gender model include at least two convolution layers.

In an optional embodiment, the network layers may further include at least one first fully connected layer and a first classifier. At this time, the performing the gender training on a gender model according to the face image samples to converge the gender model may be: performing the gender training on the at least two convolution layers, the at least one first fully connected layer and the first classifier included in the gender model according to the gender labeling information of the face image samples to converge the gender model.

Operation 102: performing age training on an age model according to the face image samples and the weights of the at least two convolution layers after the convergence to converge the age model, wherein the age model includes the at least two convolution layers.

The operation 102 is: performing the age training on the age model according to the face image samples to converge the age model, wherein the age model includes the at least two convolution layers, and the weights of the at least two convolution layers included in the converged age model are same as the weights of the at least two convolution layers included in the converged gender model.

Here, the age model is used to detect the age of the face image, while in order to enable the gender information to supervise the age estimation, the age model and the gender model in the embodiment of the present application share a part of the convolution layers, i.e., the at least two convolution layers described above. Here, the age model may also be a deep neural network model, the at least two convolution layers in the age model undergo the training of the operation 101, and the weight of each convolution layer is convergent for the gender prediction. In order to realize the supervision of the age estimation by the gender information, when the age training is performed on the age model, the weight of each of the at least two convolution layers may remain unchanged, i.e., be still the weight after the gender model is trained to be converged in the operation 101. Then, the multiple face image samples labeled with the age information described above are input to the age model to train the age model. In the training process of the age model, the weights of the at least two convolution layers described above in the age model are not modified, while the weights of other network layers of the age model are adjusted until the adjusted weight of each network layer makes the age model converge. The so-called convergence of the age model means that the error between the age estimation result outputted by the age model and the actual age is less than the preset age error threshold. In addition to the at least two convolution layers of the gender model described above, the network layers of the age model may include other network layers.

In an optional embodiment, the network layers of the age model may further include at least one convolution layer, at least one second fully connected layer and a second classifier. At this time, the performing the age training on the age model according to the face image samples to converge the age model may be: performing the age training on the at least one convolution layer, the at least one second fully connected layer and the second classifier included in the age model according to the age labeling information of the face image samples to converge the age model.

Operation 103: performing the age estimation on an inputted face image according to the converged age model.

Here, any face image that requires the age estimation may be identified by using the age model that is converged through the training with supervision of the gender information described above. Specifically, the face image is input to the age model and the age estimation result may be output through the prediction of the age model.

Thus, in the embodiments of the present application, the gender model and the age model share at least two convolution layers, and the gender model is trained to be converged; and the age model is trained, where the weights of the at least two convolution layers described above remain unchanged in the age model training process and they are still the weights after the convergence of the gender model, so that the training process of the age model is supervised by the gender information. Finally, the converged age model is utilized to perform the age estimation on the face image, which can eliminate the problem of inaccurate age estimation caused by the gender difference in face images, and further improve the accuracy of the age estimation.

In order to better understand the technical solution provided by the embodiments of the present application, the above technical solution provided by the embodiments of the present application will be described below in detail with reference to FIG. 2. The flow of the age estimation method of the face image in this embodiment mainly includes the following operations.

Operation 1: collecting a batch of face image samples of different ages, dividing these face image samples into 16 categories according to age labels, and labeling each face image with gender information.

Specifically, as shown in Table 1, 16 categories of ages are: 0-1 years old, 2-4 years old, 5-6 years old, 7-12 years old, 13-15 years old, 16-18 years old, 19-22 years old, 23-25 years old, 26-30 years old, 31-35 years old, 36-40 years old, 41-45 years old, 46-50 years old, 51-55 years old, 56-60 years old, and more than 60 years old. For each category of age, the mean age of each category of age is further set in Table 1 in the embodiment of the present application, successively being: 0.5 years old, 3 years old, 5.5 years old, 9.5 years old, 14 years old, 17 years old, 20.5 years old, 24 years old, 28 years old, 33 years old, 38 years old, 43 years old, 48 years old, 53 years old, 58 years old, 60 years old.

TABLE 1

| Category | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Age band | 0-1 | 2-4 | 5-6 | 7-12 | 13-15 | 16-18 | 19-22 | 23-25 | 26-30 | 31-35 | 36-40 | 41-45 | 46-50 | 51-55 | 56-60 | 60- |
| Age mean | 0.5 | 3 | 5.5 | 9.5 | 14 | 17 | 20.5 | 24 | 28 | 33 | 38 | 43 | 48 | 53 | 58 | 60 |

In an embodiment of the present application, the classification of age labels and the number of categories may be defined according to the requirements. The division of the age labels into the 16 categories described above is merely taken as an example for illustration, and not used for limitation.

Figure 2:
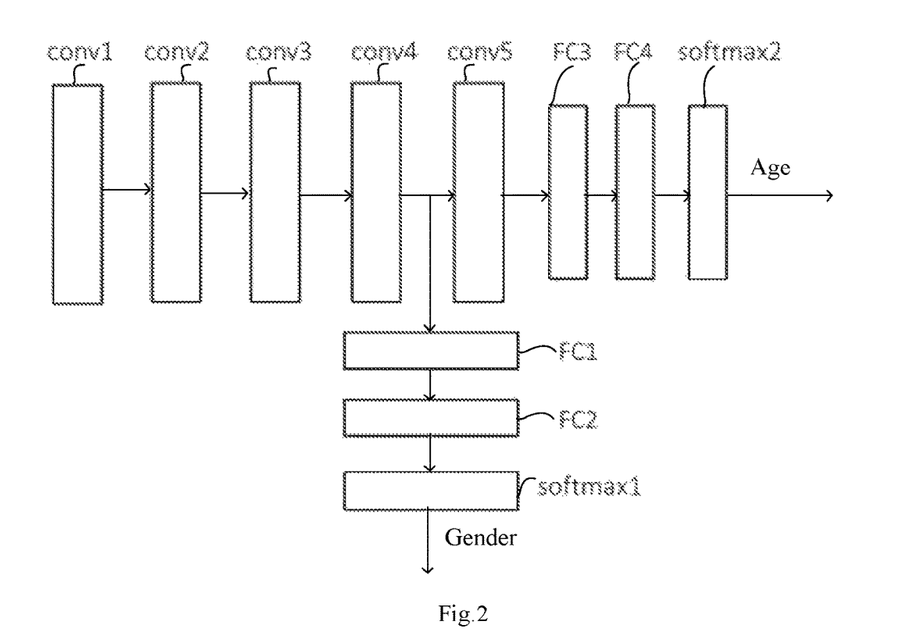
FIG. 2 is a schematic diagram of a deep neural network model in an embodiment of the present application.

Operation 2: constructing a deep neural network model, as illustrated in FIG. 2, which may be divided into a gender model and an age model, wherein both the gender model and the age model are deep neural network models, and each of them includes three parts: convolution layer, fully connected layer, and classification layer.

As illustrated in FIG. 2, the gender model includes four convolution layers conv1, conv2, conv3, and conv4, two fully connected layers FC1 and FC2, and a classification layer softmax1. Here, the gender model in this embodiment includes four convolution layers. In the embodiments of the present application, the number of convolution layers in the gender model may be two or more than two, and may be flexibly set as required. The number of fully connected layers in the gender model may be one or more than one, and may be flexibly set as required. When the gender training is performed on the gender model, the features output by the last convolution layer conv4 may be input to the FC1, the features output by the FC1 are then input into the FC2, and the features output by the FC2 are finally input into the softmax1 for the gender classification.

Optionally, the age model may include a fifth convolution layer conv5 in addition to the above four convolution layers of the gender model. In addition, the age model may further include at least one fully connected layer which is connected to the last convolution layer conv5 in the age model, e.g., two fully connected layers FC3 and FC4 shown in FIG. 2. In addition, the age model may further include at least one classification layer, e.g., the classification layer softmax2 shown in FIG. 2, and the softmax2 is connected behind the last fully connected layer FC4. When the age training is performed on the age model, the features output by the conv4 may be input to the conv5, the features output by the conv5 are then input to the FC3, the features output by the FC3 are then input to the FC4, and finally, the features output by the FC4 are then input to the softmax2 for the age classification detection.

Operation 3: training the deep neural network models constructed in the operation 2 by using the face image samples labeled with the gender information and age information obtained in the operation 1.

In an embodiment of the present application, the training of the deep neural network models may include two trainings.

First training: the face image samples labeled with the gender information in Table 1 are input to the gender model, so as to train the conv1, conv2, conv3, conv4, FC1, FC2 and softmax1 to converge the gender model. The specific training process may be: the gender model may output a gender prediction result each time a face image sample is input to the gender model, and the weight of each network layer in the gender model is adjusted according to the difference between the gender prediction result and the actual gender of the face image sample. Then, another face image sample is input to the gender model, and the gender model with the weight of each network layer adjusted is utilized to continue the gender prediction and adjust the weight of each network layer until the error between the gender prediction result and the actual gender of the face image sample is less than the preset gender error threshold (for example, 1%), so that the gender model converges and can learn the gender features.

In an example, the training process of the gender model may be: inputting each face image sample labeled with the gender information to the gender model, to obtain the gender prediction result of each face image sample. Based on the gender prediction result of each face image sample and the actual gender of each face image sample, the gender loss value is determined by using a preset loss function. It is judged whether the determined gender loss value is less than the preset gender loss threshold. If the determined gender loss value is less than the preset gender loss threshold, it can be determined that the gender model converges. If the determined gender loss value is not less than the preset gender loss threshold, the weight of each network layer in the gender model is adjusted and the gender model is retrained, that is, each face image sample is re-input to the gender model to obtain the gender prediction result of each face image sample until the determined gender loss value is less than the preset loss threshold.

Second training: after the gender model converges, the weights of conv1, conv2, conv3 and conv4 in the gender model converged after the first training may be fixed. Then, the above face image samples labeled with the age information are input to the age model to train the conv5, FC3, FC4 and softmax2 in the age model to converge the age model. The specific training process may be: the age model may output an age prediction result each time a face image sample is input to the age model, and the weights of the above-mentioned conv5, FC3, FC4 and softmax2 in the age model may be adjusted according to the difference between the age prediction result and the actual age of the face image sample. The actual age here is the age mean value in Table 1. For example, for a face image belonging to the category 1, the age of the face image is 2 years old, so the actual age of the face image is the age mean value of 3 years old.

Then, another face image sample is input to the age model, and the age model with the weights of conv5, FC3, FC4 and softmax2 adjusted is utilized to continue the steps of performing the age prediction and adjusting the weights of conv5, FC3, FC4 and softmax2 until the error between the age prediction result and the actual age of the face image is less than the preset age error threshold (for example, 2%), so that the age model converges and can learn the age features.

In an example, the training process of the age model may be: inputting each face image sample labeled with the age information to the age model, to obtain the age prediction result of each face image sample. Based on the age prediction result of each face image sample and the actual age of each face image sample, the age loss value is determined by using a preset loss function. It is judged whether the determined age loss value is less than the preset age loss threshold. If the determined age loss value is less than the preset age loss threshold, it can be determined that the age model converges. If the determined age loss value is not less than the preset age loss threshold, the weights of conv5, FC3, FC4 and softmax2 in the age model is adjusted and the age model is retrained, that is, each face image sample is re-input to the age model to obtain the age prediction result of each face image sample until the determined age loss value is less than the preset age loss threshold.

Optionally, the training of the deep neural network model may further include a third training.

Specifically, the third training is: after the age model converges, a preset learning rate may be selected and the learning rate of the age model is set to the preset learning rate. The preset learning rate may be a smaller learning rate. The above-mentioned face image samples are used for the overall training of the age model until the age model converges again to thereby obtain the accurate age model. Here, the overall training of the age model includes the training of conv1, conv2, conv3, conv4, conv5, FC3, FC4 and softmax2 in the age model. The main purpose of the third training is to fine-tune the weights of conv1, conv2, conv3 and conv4 after the convergence of the first training as well as the weights of conv5, FC3, FC4 and softmax2 after the convergence of the second training, implementing the fine tuning of the weight of each network layer in the age model. The update magnitude of the weight of each network layer in the age model is related to the learning rate. In this embodiment, by selecting a smaller preset learning rate, the weight of each network layer is updated to a small extent, implementing the fine tuning of the weight of each network layer in the age model.

Operation 4: performing the age estimation on a face image to be tested by using the trained and converged age model in the operation 3, so that the softmax2 can output the probability value corresponding to each age category (i.e., 16 categories in Table 1) of the face image.

Specifically, the face image to be tested is input into the trained and converged age model in the Operation 3 to obtain the probability value of the face image to be tested belonging to each age category.

Operation 5: estimating and calculating the age of the face image to be tested by using the probability value corresponding to each age category output by the age model and the age corresponding to each age category.

In one embodiment, the age estimation and calculation formula is as shown by formula (1):

$$\text{meanAge} = \Sigma_i^n \text{MiddleAge}_i \times p_i; \qquad \text{formula (1)}$$

wherein $\text{MiddleAge}_i$ is the mean age corresponding to the $i^{th}$ age category as shown in Table 1, $p_i$ is the probability value corresponding to the $i^{th}$ age category output by the deep neural network model as illustrated in FIG. 2 in an embodiment of the present application, and i is a serial number of age categories, as shown in Table 1, where i is an integer greater than or equal to zero and less than or equal to 15.

In another embodiment, the largest probability value is selected from the probability values corresponding to all the age categories output by the age model. The age mean value of the age category corresponding to the largest probability value is used as the estimated age of the face image to be tested.

With the help of the technical solution of the embodiments of the present application described above, the embodiments of the present application consider that there is a great correlation between the age and gender of the face image, especially the relationship between the perceived age and gender of the face image of an adult is more prominent, for example, women pay more attention to maintenance than men. Under the condition that the actual ages of men and women are the same, the perceived ages of the face images of the men and women may be different greatly. In the social networks, the perceived ages of the face images in pictures and videos are often significantly different from the actual ages. Therefore, in order to accurately estimate the actual age of the face image, it is necessary to use the gender information of the face image to assist in estimating the age of the face image. The age model used for age classification in the deep neural network model of the embodiments of the present application can be trained under the supervision of the gender information, to thereby further ensure the accuracy of the age classification detection and improve the accuracy of the age estimation of the face images.

In the embodiments of the present application, for the sake of simple description, the method embodiments are all expressed as a series of action combinations. However, those skilled in the art should know that the embodiments of the present application are not limited by the described sequence of actions. Thus, according to the embodiments of the present application, certain operations may be performed in other orders or simultaneously. Secondly, those skilled in the art should also know that the embodiments described in the specification are all the preferred embodiments, and the involved actions are not all necessarily required by the embodiments of the present application.

Figure 3:
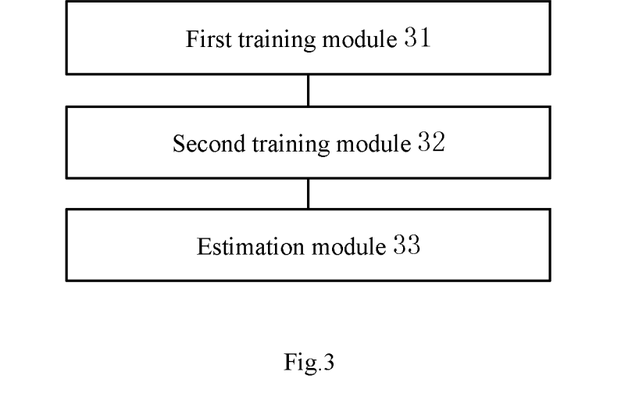
FIG. 3 is a structural block diagram of an age estimation device according to an embodiment of the present application.

Corresponding to the above method provided by the embodiment of the present application, referring to FIG. 3, a structural block diagram of an age estimation device according to an embodiment of the present application is illustrated, which may specifically include the following modules.

A first training module 31 is configured to perform gender training on a gender model according to face image samples to converge the gender model, wherein the gender model includes at least two convolution layers.

Here, the face image samples include multiple face images, and each face image is labeled with age information and gender information. Here, the gender model is used to detect the gender of the face image, the gender model may be a deep neural network model, and the gender model includes at least two convolution layers. In the embodiment of the present application, the gender training is performed on the gender model by using the face image samples labeled with gender information, so as to adjust the weight of each network layer in the gender model until the gender model converges. The so-called convergence of the gender model means that the error between the gender prediction result outputted by the gender model and the actual gender is less than the preset error threshold. The network layers include a convolution layer, a fully connected layer and a classification layer. The classification layer is the classifier.

A second training module 32 is configured to perform age training on an age model according to the face image samples to converge the age model, wherein the age model includes the at least two convolution layers, and weights of the at least two convolution layers included in the converged age model are same as weights of the at least two convolution layers included in the converged gender model.

Here, the age model is used to detect the age of the face image, while in order to enable the gender information to supervise the age estimation, the age model and the gender model in the embodiment of the present application share a part of the convolution layers, i.e., the at least two convolution layers described above. Here, the age model may also be a deep neural network model, at least two convolution layers in the age model are trained by the first training module 31, and the weight of each of the at least two convolution layer is convergent for the gender prediction. In order to realize the supervision of the age estimation by the gender information, when the age training is performed on the age model, the weight of each of the at least two convolution layers may remain unchanged, i.e., be still the weight after the first training module 31 trains the gender model to converge. Then, the multiple face image samples labeled with the age information described above are input to the age model to train the age model. In the training process of the age model, the weights of the at least two convolution layers described above in the age model are not modified, while the weights of other network layers of the age model are adjusted until the adjusted weight of each network layer makes the age model converge. The so-called convergence of the age model means that the error between the age estimation result outputted by the age model and the actual age is less than the preset age error threshold.

An estimation module 33 is configured to perform the age estimation on an inputted face image according to the converged age model.

Here, any face image that requires the age estimation may be identified by using the age model that is converged through the training which is supervised by the gender information described above. Specifically, the face image is input to the age model and the age estimation result may be output through the estimation of the age model.

Thus, in the embodiments of the present application, the gender model and the age model share at least two convolution layers, and the gender model is trained to be converged; and the age model is trained, where the weights of the at least two convolution layers described above remain unchanged in the age model training process and they are still the weights after the convergence of the gender model, so that the gender information can supervise the training process of the age model. Finally, the converged age model is utilized to perform the age estimation on the face image, which can eliminate the problem of inaccurate age estimation caused by the gender difference in face images, and further improve the accuracy of the age estimation.

In a possible embodiment, the gender model further includes at least one first fully connected layer and a first classifier, and the first training module 31 may include:

a first training submodule configured to perform the gender training on the at least two convolution layers, the at least one first fully connected layer and the first classifier included in the gender model according to the gender labeling information of the face image samples to converge the gender model.

In a possible embodiment, the age model further includes at least one convolution layer, at least one second fully connected layer and a second classifier, and the second training module 32 may include:

a second training submodule configured to perform the age training on the at least one convolution layer, the at least one second fully connected layer and the second classifier included in the age model according to the age labeling information of the face image samples to converge the age model.

In a possible embodiment, the age estimation device according to an embodiment of the present application may further include:

a third training module configured to set a learning rate of the age model to a preset learning rate after the age model is converged, and perform a secondary age training on the age model according to the face image samples to converge the age model again.

In a possible embodiment, the estimation module 33 may include:

an estimation submodule configured to perform the age estimation on the inputted face image according to the converged age model to obtain the probability value corresponding to each age category; and a calculation submodule configured to calculate the estimated age of the face image according to the probability value corresponding to each age category and the age corresponding to each age category.

In a possible embodiment, the calculation submodule is specifically configured to calculate the estimated age, meanAge, of the face image by using the formula of:

$$\text{meanAge} = \Sigma_i^n \text{MiddleAge}_i \times p_i;$$

wherein $\text{MiddleAge}_i$ is the mean age corresponding to the $i^{th}$ age category, $p_i$ is the probability value corresponding to the $i^{th}$ age category, and n is the number of age categories.

As for the embodiments of the age estimation device, they are substantially similar to the embodiments of the age estimation method, so the description is relatively simple, and the related parts refer to the illustration of the parts of the embodiments of the age estimation method.

Figure 4:
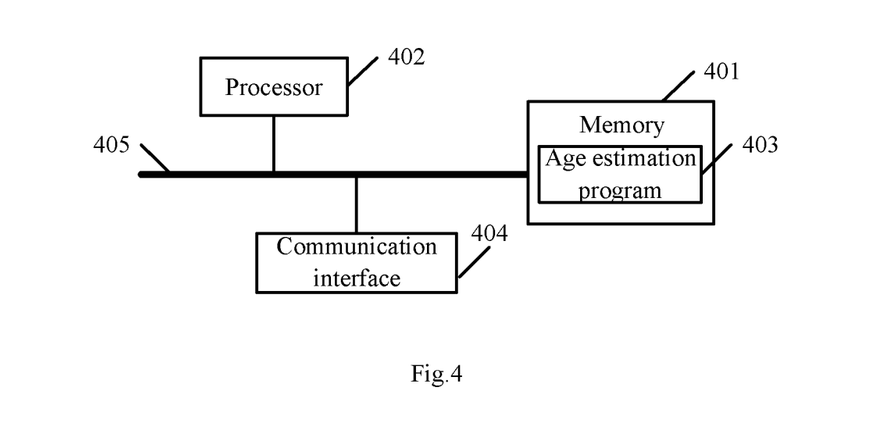
FIG. 4 is a structural block diagram of a mobile terminal according to an embodiment of the present application.

Corresponding to the method provided by the embodiments of the present application described above, a mobile terminal is further provided according to another embodiment of the present application. As illustrated in FIG. 4, the mobile terminal includes: a memory 401, a processor 402, and an age estimation program 403 that is stored on the memory and can run on the processor, where the age estimation program 403 implements the operations of the age estimation method of the above embodiments when executed by the processor 402. Specifically, the age estimation method includes the following operations:

performing the gender training on a gender model according to the face image samples to converge the gender model, wherein the gender model includes at least two convolution layers;

performing the age training on an age model according to the face image samples to converge the age model, wherein the age model includes the at least two convolution layers, and the weights of the at least two convolution layers included in the converged age model are same as the weights of the at least two convolution layers included in the converged gender model; and performing the age estimation on an inputted face image according to the converged age model.

In the embodiments of the present application, the gender model and the age model share at least two convolution layers, and the gender model is trained to be converged; and the age model is trained, where the weights of the at least two convolution layers described above remain unchanged in the age model training process and they are still the weights after the convergence of the gender model, so that the gender information can supervise the training process of the age model. Finally, the converged age model is utilized to perform the age estimation on the face image, which can eliminate the problem of inaccurate age estimation caused by the gender difference in face images, and further improve the accuracy of the age estimation.

In one embodiment, as illustrated in FIG. 4, the mobile terminal may further include: a communication interface 404 and a communication bus 405. The processor 402, the communication interface 404, and the memory 401 communicate with each other via the communication bus 405.

The above communication bus may be the Peripheral Component Interconnect (PCI) bus or Extended Industry Standard Architecture (EISA) bus or the like. The communication bus may be divided into the address bus, data bus, control bus and so on. For ease of representation, the buses are represented by only one thick line in FIG. 4, but it does not represent only one bus or only one type of bus.

The above communication interface is used for the communications between the above mobile terminal and other devices.

The above memory may include Random Access Memory (RAM) or non-volatile memory, e.g., at least one disk memory. Optionally, the above memory may also be at least one storage device located far from the foregoing processor.

The above processor may be a general-purpose processor, including Central Processing Unit (CPU), Network Processor (NP) or the like; it may also be Digital Signal Processor (DSP), Application Specific Integrated Circuit (ASIC), Field-Programmable Gate Array (FPGA), or another programmable logic device, discrete gate or transistor logic device, discrete hardware component.

As for the embodiments of the mobile terminal, they are substantially similar to the embodiments of the age estimation method, so the description is relatively simple, and the related parts refer to the illustration of the parts of the embodiments of the age estimation method.

Corresponding to the method provided by the embodiments of the present application described above, a computer readable storage medium is further provided according to another embodiment of the present application. The computer readable storage medium stores an age estimation program thereon, where the age estimation program implements the operations in the age estimation method of the above embodiments when executed by a processor. Specifically, the age estimation method includes the following operations:

performing the gender training on a gender model according to the face image samples to converge the gender model, wherein the gender model includes at least two convolution layers;

performing the age training on an age model according to the face image samples to converge the age model, wherein the age model includes the at least two convolution layers, and the weights of the at least two convolution layers included in the converged age model are same as the weights of the at least two convolution layers included in the converged gender model; and performing the age estimation on an inputted face image according to the converged age model.

In the embodiments of the present application, the gender model and the age model share at least two convolution layers, and the gender model is trained to be converged; and the age model is trained, where the weights of the at least two convolution layers described above remain unchanged in the age model training process and they are still the weights after the convergence of the gender model, so that the gender information can supervise the training process of the age model. Finally, the converged age model is utilized to perform the age estimation on the face image, which can eliminate the problem of inaccurate age estimation caused by the gender difference in face images, and further improve the accuracy of the age estimation.

As for the embodiments of the computer readable storage medium, they are substantially similar to the embodiments of the age estimation method, so the description is relatively simple, and the related parts refer to the illustration of the parts of the embodiments of the age estimation method.

Corresponding to the method provided by the embodiments of the present application described above, a computer program is further provided according to another embodiment of the present application, where the computer program implements the operations in the age estimation method of the above embodiments when executed by a processor. Specifically, the age estimation method includes the following operations:

performing the gender training on a gender model according to the face image samples to converge the gender model, wherein the gender model includes at least two convolution layers;

performing the age training on an age model according to the face image samples to converge the age model, wherein the age model includes the at least two convolution layers, and the weights of the at least two convolution layers included in the converged age model are same as the weights of the at least two convolution layers included in the converged gender model; and performing the age estimation on an inputted face image according to the converged age model.

In the embodiments of the present application, the gender model and the age model share at least two convolution layers, and the gender model is trained to be converged; and the age model is trained, where the weights of the at least two convolution layers described above remain unchanged in the age model training process and they are still the weights after the convergence of the gender model, so that the gender information can supervise the training process of the age model. Finally, the converged age model is utilized to perform the age estimation on the face image, which can eliminate the problem of inaccurate age estimation caused by the gender difference in face images, and further improve the accuracy of the age estimation.

As for the embodiments of the computer program, they are substantially similar to the embodiments of the age estimation method, so the description is relatively simple, and the related parts refer to the illustration of the parts of the embodiments of the age estimation method.

All the embodiments in the specification are described in a progressive manner, the emphasis of each embodiment is different from other embodiments, and the same or similar parts among the various embodiments can refer to each other.

It should be understood by those skilled in the art that the embodiments of the present application may be provided as methods, devices and computer program products. Thus the embodiments of the present application can take the form of hardware embodiments alone, software embodiments alone, or embodiments combining the software and hardware aspects. Also the embodiments of the present application can take the form of computer program products implemented on one or more computer usable storage mediums (including but not limited to magnetic disk memories, CD-ROMs, optical memories and the like) containing computer usable program codes therein.

The embodiments of the present application are described by reference to the flow charts and/or the block diagrams of the methods, the terminal devices (systems) and the computer program products according to the embodiments of the present application. It should be understood that each process and/or block in the flow charts and/or the block diagrams, and a combination of processes and/or blocks in the flow charts and/or the block diagrams may be implemented by the computer program instructions. These computer program instructions may be provided to a general-purpose computer, a dedicated computer, an embedded processor, or a processor of another programmable data processing terminal device to produce a machine, so that an apparatus for implementing the functions specified in one or more processes of the flow charts and/or one or more blocks of the block diagrams is produced by the instructions executed by the computer or the processor of another programmable data processing terminal device.

These computer program instructions can also be stored in a computer readable memory which is capable of guiding the computer or another programmable data processing terminal device to operate in a particular way, so that the instructions stored in the computer readable memory produce a manufacture including the instruction apparatus which implements the functions specified in one or more processes of the flow charts and/or one or more blocks of the block diagrams.

These computer program instructions may also be loaded onto the computer or another programmable data processing terminal device, so that a series of operation steps are performed on the computer or another programmable terminal device to produce the computer-implemented processing. Thus the instructions executed on the computer or another programmable terminal device provide steps for implementing the functions specified in one or more processes of the flow charts and/or one or more blocks of the block diagrams.

Although the preferred ones of the embodiments of the present application have been described, those skilled in the art may make additional alterations and modifications to these embodiments once they learn about the basic creative concepts. Thus the attached claims are intended to be interpreted to include the preferred embodiments as well as all the alterations and modifications falling within the scope of the embodiments of the present application.

Finally, it should be noted that the relational terms such as first and second herein are only used to distinguish one entity or operation from another and do not necessarily require or imply any such actual relationship or sequence between these entities or operations. And the term "comprise", "contain" or any other variant is intended to encompass the non-exclusive inclusion, so that the process, method, object or terminal device including a series of elements not only includes those elements, but also includes other elements which are not listed clearly or includes the elements inherent in such process, method, object or terminal device. Without more restrictions, the element defined by the sentence "include a . . . " does not preclude the existence of another identical element in the process, method, object or terminal device including the element.

The age estimation method and the age estimation device provided by the present application have been introduced in detail above, and specific examples are applied herein to explain the principle and embodiments of the present application. The above illustration of the embodiments is merely used to assist in understanding the method of the application and its core idea; and at the same time, for those ordinary skilled in the art, there may be changes in the specific embodiments and application scope according to the idea of the present application. In conclusion, the content of the specification should not be construed as the limitation on the present application.

What is claimed is:

1. An age estimation method comprising:
performing gender training on a gender model according to face image samples to converge the gender model, wherein the gender model comprises at least two convolution layers;
performing age training on an age model according to the face image samples to converge the age model, wherein the age model comprises the at least two convolution layers, and in the training process of the age model, weights of the at least two convolution layers after convergence remain unchanged, and weights of network layers other than the at least two convolution layers in the age model are adjusted until the adjusted weights of network layers make the age model converge; and
performing age estimation on an inputted face image according to the converged age model;
wherein the gender model further comprises at least one first fully connected layer and a first classifier; and the age model further comprises at least one convolution layer, at least one second fully connected layer and a second classifier in addition to the at least two convolution layers.

2. The method according to claim 1, wherein the performing gender training on the gender model according to the face image samples to converge the gender model, comprises:
performing gender training on the at least two convolution layers, the at least one first fully connected layer and the first classifier comprised in the gender model according to gender labeling information of the face image samples, to converge the gender model.

3. The method according to claim 1, wherein the performing age training on the age model according to the face image samples to converge the age model, comprises:
performing age training on the at least one convolution layer, the at least one second fully connected layer and the second classifier comprised in the age model according to age labeling information of the face image samples, to converge the age model.

4. The method according to claim 1, wherein before performing the age estimation on the inputted face image according to the converged age model, the method further comprises:

setting a learning rate of the age model to a preset learning rate after converging the age model, and performing secondary age training on the age model according to the face image samples to converge the age model again.

5. The method according to claim 1, wherein the performing age estimation on the inputted face image according to the converged age model, comprises:
performing age estimation on the inputted face image according to the converged age model to obtain a probability value corresponding to each age category; and
calculating an estimated age of the inputted face image according to the probability value corresponding to each age category and an age corresponding to each age category.

6. The method according to claim 5, wherein the calculating the estimated age of the inputted face image according to the probability value corresponding to each age category and the age corresponding to each age category, comprises:
calculating the estimated age, meanAge, of the inputted face image by using a formula of:

$$\text{meanAge} = \Sigma_i^n \text{MiddleAge}_i \times p_i;$$

wherein $\text{MiddleAge}_i$ is a mean age corresponding to an $i^{th}$ age category, $p_i$ is a probability value corresponding to the $i^{th}$ age category, and n is a number of age categories.

7. An age estimation device comprising:
a processor; and
a memory, configured to store an executable instruction of the processor;
wherein the processor is configured to execute the instruction stored in the memory:
to perform gender training on a gender model according to face image samples to converge the gender model, wherein the gender model comprises at least two convolution layers;
to perform age training on an age model according to the face image samples to converge the age model, wherein the age model comprises the at least two convolution layers, and in the training process of the age model, weights of the at least two convolution layers after convergence remain unchanged, and weights of network layers other than the at least two convolution layers in the age model are adjusted until the adjusted weights of network layers make the age model converge; and
to perform age estimation on an inputted face image according to the converged age model;
wherein the gender model further comprises at least one first fully connected layer and a first classifier; and the age model further comprises at least one convolution layer, at least one second fully connected layer and a second classifier in addition to the at least two convolution layers.

8. The device according to claim 7, wherein the processor is configured to execute the instruction stored in the memory:
to perform gender training on the at least two convolution layers, the at least one first fully connected layer and the first classifier comprised in the gender model according to gender labeling information of the face image samples, to converge the gender model.

9. The device according to claim 7, wherein the processor is configured to execute the instruction stored in the memory:

to perform age training on the at least one convolution layer, the at least one second fully connected layer and the second classifier comprised in the age model according to age labeling information of the face image samples, to converge the age model.

10. The device according to claim 7, wherein the processor is further configured to execute the instruction stored in the memory:

to set a learning rate of the age model to a preset learning rate after converging the age model, and perform secondary age training on the age model according to the face image samples to converge the age model again.

11. The device according to claim 7, wherein the processor is configured to execute the instruction stored in the memory:

to perform age estimation on the inputted face image according to the converged age model to obtain a probability value corresponding to each age category; and to calculate an estimated age of the inputted face image according to the probability value corresponding to each age category and an age corresponding to each age category.

12. The device according to claim 11, wherein the processor is configured to execute the instruction stored in the memory to calculate the estimated age, meanAge, of the inputted face image by using a formula of:

$$\text{meanAge} = \Sigma_i^n \text{MiddleAge}_i \times p_i;$$

wherein $\text{MiddleAge}_i$ is a mean age corresponding to an $i^{th}$ age category, $p_i$ is a probability value corresponding to the $i^{th}$ age category, and n is a number of age categories.

13. A mobile terminal, comprising: a memory, a processor and an age estimation program that is stored on the memory and can run on the processor, wherein the age estimation program implements the age estimation method of claim 1 when executed by the processor.

14. A non-transitory computer readable storage medium storing an age estimation program which implements the age estimation method of claim 1 when executed by a processor.

* * * * *